Dec. 16, 1952    J. H. FRIEDMAN    2,621,344
METHOD AND APPARATUS FOR MAKING HOLLOW ARTICLES
Filed May 20, 1949    5 Sheets-Sheet 2
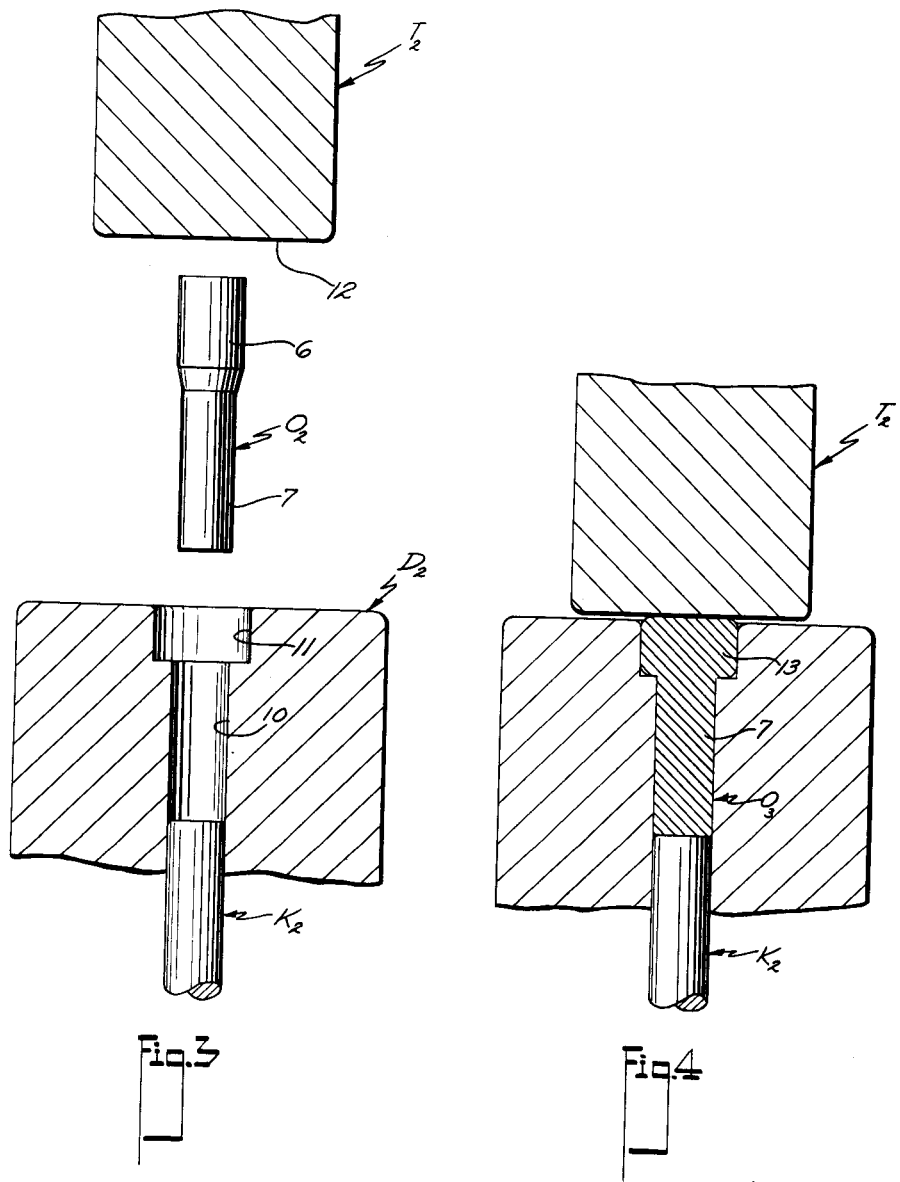
INVENTOR.
JOHN H. FRIEDMAN
BY Richey & Watts
ATTORNEYS

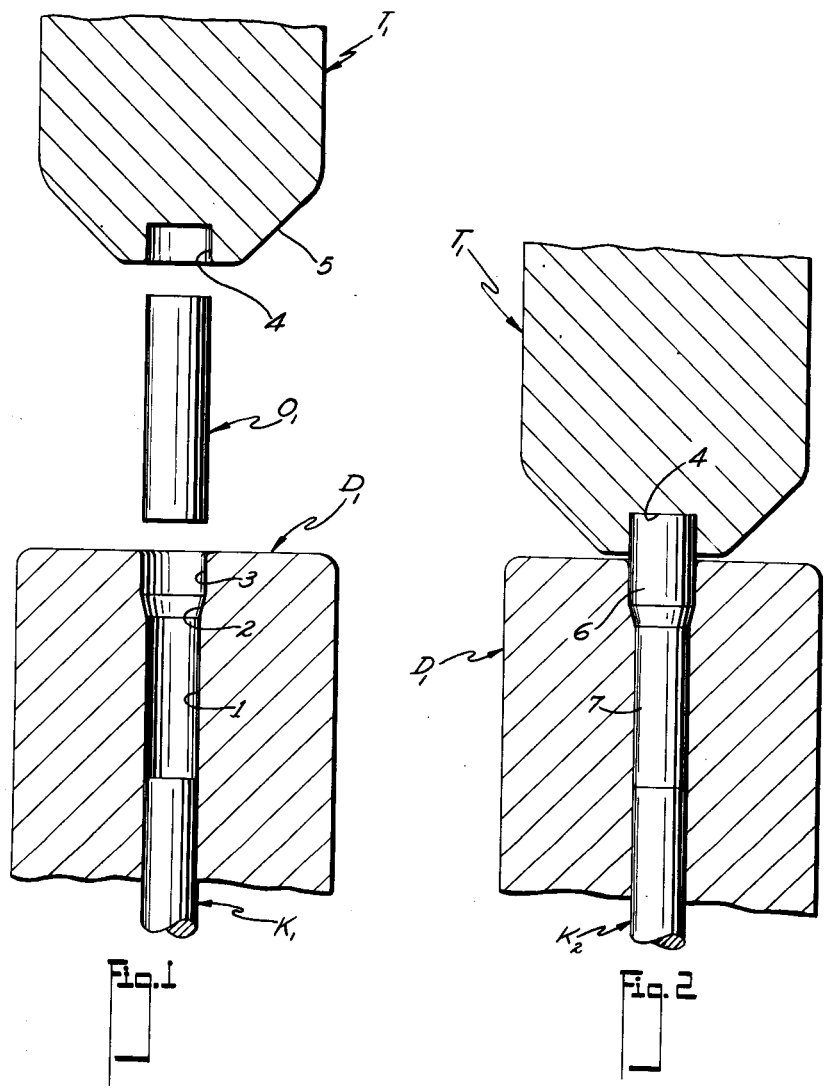

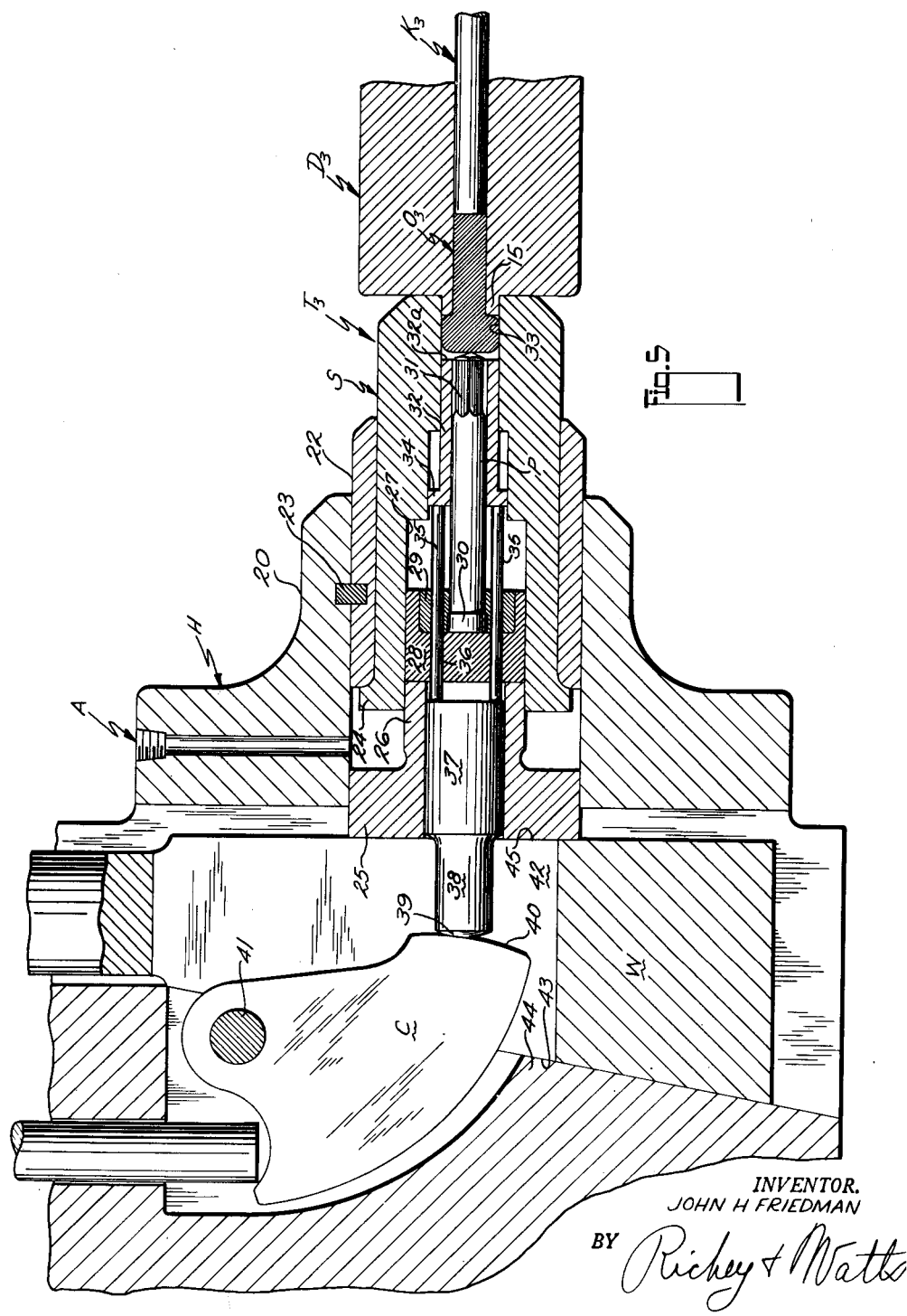

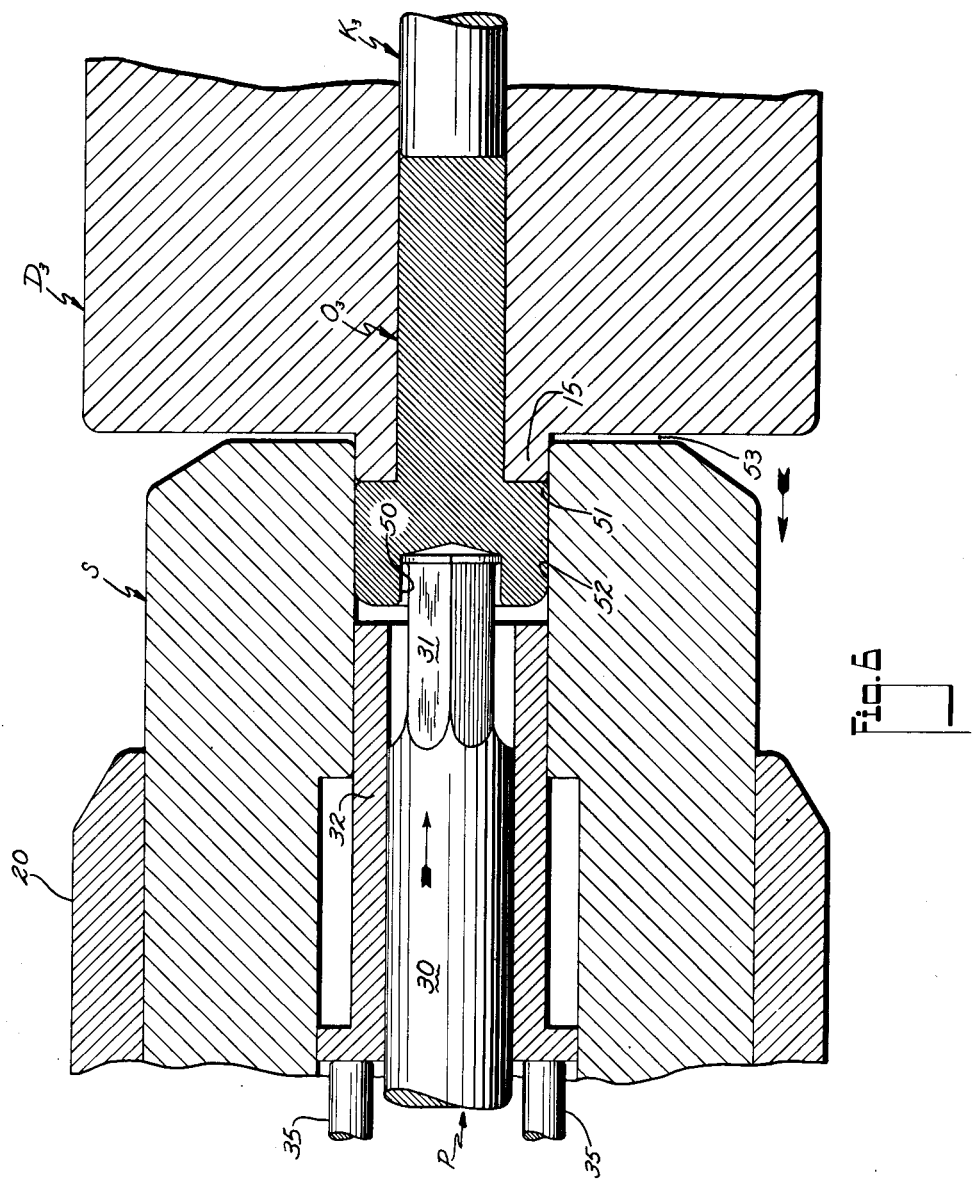

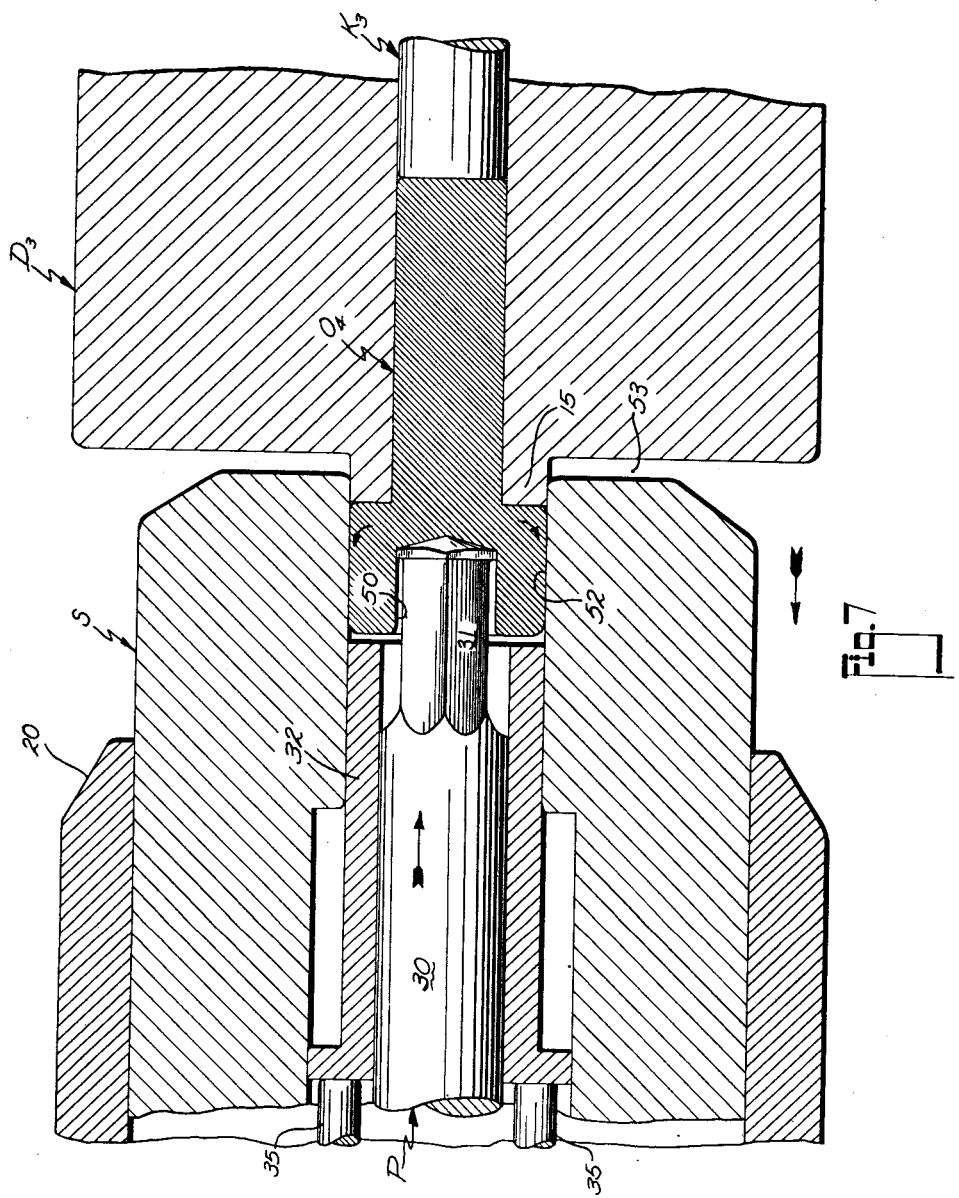

Patented Dec. 16, 1952

2,621,344

UNITED STATES PATENT OFFICE 2,621,344

METHOD AND APPARATUS FOR MAKING HOLLOW ARTICLES

John H. Friedman, Tiffin, Ohio, assignor to The National Machinery Company, Tiffin, Ohio, a corporation of Ohio Application May 20, 1949, Serial No. 94,497

6 Claims. (Cl. 10—11)

This invention relates to methods and apparatus for forming socketed articles including cap screws or bolts from wire or rod stock by cold working the metal.

The general type of machine capable of carrying out the method to which this invention relates is shown in the patent to Clouse, 1,856,027, April 26, 1932. The machine includes a frame and die block containing a number of dies, a reciprocating header slide carrying metal forming tools and an intermittent feed mechanism to feed the stock to one of the dies at the proper time. The machine includes a shear mechanism to shear off a blank from the stock and transfer mechanism to transfer the blanks from die to die until the final operation is completed, a typical transfer mechanism being shown in Clouse, 2,026,823, January 7, 1936. Such machines are also provided with means to knock out the various blanks from their respective dies at the proper time in order that they may be received by the transfer mechanism.

The present invention is directed to novel tool and die operations and sequence of operations and a novel method of forming a socketed, headed article. One of the primary objectives in designing tools for cold heading machines is to produce the desired article with a minimum of cold working and displacement of metal in the blank, it being well known that such cold working of the metal renders it brittle and liable to crack as well as making it hard to work, materially reducing the life of the tools. It is an object of this invention to reduce the cold working and hardening of the metal at the zone wherein the blank is to be pierced or socketed. This is accomplished by starting with a blank to be headed which is of larger diameter than the shank of the bolt and extruding the shank portion in a die of smaller diameter, thereby leaving the portion to be headed in its original condition. The unworked head part is then upset in a cylindrical die to form a cylindrical head, but the upsetting operation is not carried far enough to fill out the corners. Since the final stage of filling out the corners requires considerable pressure, the cylindrical head is not objectionably cold worked. The upset head is then readily socketed and advantage is taken of the socketing operation to fill out the corners of the blank.

A cause of rapid tool wear in prior cold heading operations of the sort to which this invention relates is the reversed flow or extrusion of metal along the walls of the metal confining member or die, during the socketing operation. Not only does this extrusion excessively cold work the metal and make it brittle, but it rapidly wears and abrades the confining member so that accuracy is not maintained. It is another object of this invention to greatly reduce tool and die wear caused by extrusion of the metal. This is accomplished by confining the head during the socketing operation, the confining means (such as a movable sleeve) being so arranged that any metal which extrudes and engages the sleeve can carry it along as the metal flows.

These and other objects will be apparent to those skilled in this art as the following description proceeds.

In the drawings:

Figs. 1 and 2 show the operation performed at the first die in a preferred form, after the blank has been sheared off by the shearing mechanism. Fig. 1 shows the sheared blank positioned in front of the die and Fig. 2 shows the blank being extruded by the first tool;

Figs. 3 and 4 show the operation performed at the second die, Fig. 3 showing the blank made in the first die positioned in front of the second die and Fig. 4 showing the heading operation completed in the second die;

Fig. 5 is a sectional view showing the novel sleeve, punch, and extractor tool assembly which works in connection with the third die; and Figs. 6 and 7 are enlarged sectional views at the third die. Fig. 6 shows the socketing operation partially completed and Fig. 7 shows it completed.

In Fig. 1 the sheared blank $O_1$ is shown positioned in front of the first die $D_1$. Of course, the complete machine has a shearing mechanism and a transfer mechanism to cut off and position the blank, but this is conventional structure and the patents previously cited are relied upon to illustrated one example of how these mechanisms may be provided. The die $D_1$ in a preferred form has an aperture 1 of smaller section than the blank $O_1$ and a tapered wall 2 may connect with a larger bore 3 in the die, the bore 3 being substantially the same diameter as the blank $O_1$. The tool $T_1$ has a socket 4 the same size as bore 3 and the tool may be tapered back as at 5 to provide clearance.

After the blank $O_1$ is positioned in front of the die by the transfer mechanism, the tool $T_1$ advances as shown in Fig. 2, forcing the blank into the shank or reduced portion 1 of the die so that an extruded shank portion 7 is formed. The portion 6 of the blank now forms a head, which, although it is larger in diameter than the shank portion 7, has been subject to little or no cold work. At the completion of this operation, and, as the header slide and tool retract, a knock-out punch $K_1$ is operated in a proper timed relation by conventional mechanism to eject the blank $O_2$ from the die $D_1$ and into the transfer mechanism which has been positioned in front of the die to receive the blank.

In Fig. 3 the blank $O_2$ is shown positioned in front of the die $D_2$. This die has a cylindrical bore 10 which receives the knock-out punch $K_2$ and which is of the same diameter as the shank portion 7 of the blank. The die also has a bore 11 for determining the shape of the head.

As seen in Fig. 4, when the tool $T_2$ forces the blank into the die $D_2$, the shank portion 7 is relatively unaffected but the metal that was formerly the head 6 in blank $O_2$ is headed as at B to substantially fill in the die so that the blank $O_3$ has a head 13 which is substantially cylindrical. I prefer that the relative size of die and blank be such that the corners of the die are not filled at this stage, which reduces the pressure required to form the head. Due to the fact that this operation represents the first cold working of the headed portion of the blank, and, also due to the fact that the corners are not filled in, the operation shown in Fig. 4 does not seriously cold work the metal and it is still in a relatively ductile condition for the socketing operation which is to follow.

Before completing the description of the cycle of operations in the present invention, reference is made to Fig. 5 for a description of the novel tool arrangement at the third die. Header slide H, which is mounted for reciprocation in the conventional manner to and from the die block, has formed at this station a tool supporting sleeve 20. Sleeve 20 is aperture as at 21 to receive sliding sleeve S and its mounting sleeve 22, the mounting sleeve 22 being keyed in any convenient fashion as at 23 to the header slide. A flange 24 at the rear of the sliding sleeve S prevents withdrawal of the sleeve in a forward direction after the parts are assembled. A punch assembly P and a stripping sleeve 32 are carried within the sleeve S and are retained therein by a plug member 25 which is mounted within the aperture 21 of the header slide. Details of the stripping mechanism form no part of the present invention, and suitable means to operate the stripping sleeve are described in detail in my copending application, Serial No. 91,030, filed May 3, 1949.

In the interests of clarity, one form of header slide and stripping construction that may carry out the invention will be described. Plug 25 has a pilot portion 26 over which the sleeve S may slide due to the aperture 27 in the sleeve. A pair of plunger blocks 28 and 29 are assembled over the head 30 of the punch P and the hexagonal socketing portion of the punch is relieved as at 31 to facilitate entry and withdrawal thereof from the work. The above-named assembly, along with the stripping sleeve 32 is inserted through the bores in the sleeve S. The sleeve S is apertured at 33, the diameter of the aperture being equal to the diameter of the head on the finished cap screw. Since the stripping sleeve 32 slides in aperture 33, it, too, is of the same diameter. The end 32a of the stripping sleeve 32 is provided for engagement with the head of the blank and is retained there by cam mechanism described in the aforesaid patent application.

The rearward portion of the stripping sleeve 32 has a flange 34 against which a plurality of pins 35 bear, these pins passing through apertures 36 in the punch plunger blocks and being integral with, or attached to in any convenient manner, a plunger member 37. An extension 38 of the plunger member 37 has a rounded end 39 for operation by cam surface 40 on a bell crank or lever member C. Member C is mounted in the header slide by pivot 41 and is operated by fixed cam on the machine as described in the aforesaid application. The header slide is slotted as at 42 to receive lever C, and a wedge member W is provided to retain the plug 25 in the proper position. It is customary to have an axial bolt engage the plug 25 from the front to provide, in conjunction with the wedge, the necessary adjustment. The other wedge surface 43 engages the rear wall 44 of the slot in the header slide.

In this invention the die $D_3$ is specially formed in that an annular lip 15 is provided for purposes to be hereinafter described. The inner diameter of the lip is the same as that of the bore in the die which receives the shank of the blank $O_3$. The outer diameter is substantially equal to the bore 33 in the sliding sleeve so that the sleeve may slide over the annular lip on the die.

Having completed the description of the tool and die arrangement at the third station, the explanation of the remaining operation performed on the cap screw will be continued. Referring to Fig. 6, it will be seen that this is an enlarged section through the blank and apparatus taken at a time when the socketing operation is partially completed. Forward motion of the header slide has advanced the punch P into the head of the blank and the sleeve S has been advanced to surround the blank and slide over the lip 15 on the die. As the socketing operation progresses, the metal tends to flow to fill up the corners of the recess at 51. Likewise, there is a tendency of the displaced metal to extrude or flow in the opposite direction from the motion of the punch. Since the sleeve S is not positively held against the die, any extruding metal which bears against the bore 33 of the sleeve, as at 52, will tend to carry the sleeve with it and retract the sleeve from the die. In Fig. 6, for example, a small space 53 is illustrated which represents the amount that extrusion of the metal has retracted the sleeve. This figure also shows the purpose of the annular extension 15 in that this extension, in cooperation with the sleeve, results in a complete confinement of the head portion of the blank at all times during the socketing, even though the sleeve may be partially withdrawn due to the extrusion just described.

Fig. 7 shows the completion of the socketing operation and it will be noted that the sleeve has been further withdrawn leaving a greater space 53. A pair of small arrows indicate flow or extrusion of the metal which engages and grips the sleeve in the general area indicated by 52 to cause the retracting motion thereof as described. Of course, during the socketing operation the stripping sleeve 32 is held clear of the headed article as the header slide advances by the mechanism completely described in the application previously mentioned. Upon completion of the socketing operation the punch is stripped from the blank as described in detail in my aforesaid copending application, the relief on the punch facilitating this operation.

Having completed the description of my novel apparatus and method of making the socketed article, it can be seen that I have illustrated an invention whereby the socketed and headed article is produced with a minimum of cold working the metal and in a manner in which the die receives very little wear and is subjected to no extruding or abrading action from the metal of the blank. The novel sleeve and die elements make it possible to successfully socket the blank even though the head of the blank is substantially cylindrical before the socketing operation.

I contemplate that various modifications may be made without departing from the spirit of my invention. The method whereby the various elements shown in Fig. 5 are machined and assembled may be varied in accordance with conventional design practice. Although, as shown in Figs. 1 and 2, I prefer to start with an extrusion operation rather than with a heading operation, those skilled in the art will appreciate that we could start with stock of shank size and upset the end to form a head piece. The choice of starting with an extrusion or a heading operation is governed largely by the shape of the finished article and the material of which it is manufactured.

Likewise, the head of the blank shown in Fig. 4 need not be cylindrical, it could be somewhat tapered.

I have used the expression "cold working" in its usual sense, i. e., working below the temperature of rapid grain growth or recrystallization; but my invention is more particularly valuable and useful in the lower temperatures of the cold working range, since at these lower temperatures, up to about 400 or 500 degrees F. difficulties from scale, sticking in the dies and shrinkage are avoided and the problem of cleanly shearing out the wad, which I have solved, is more pronounced.

Although I have illustrated my novel apparatus and method in terms of a socketed cap screw, it will be appreciated that my invention is equally applicable to the production of any article which is socketed or pierced such as a nut or the like. These and other modifications may be made without departing from the spirit of the invention as defined in the appended claims.

Having thus described the present invention so that others skilled in the art may be able to understand and practice the same, I state that what I desire to secure by Letters Patent is defined in what is claimed.

What is claimed is:

1. The method of forming a punched article comprising forming a blank having a shank portion and a substantially cylindrical head portion with rounded corners, placing the shank of said blank in a die, surrounding said head portion of the blank with a sleeve having an internal diameter equal to that of the cylindrical blank portion, and punching said blank while cold to substantially fill in the corners and to extrude metal against the wall of said sleeve, said extruding metal carrying said sleeve with it during the punching operation.

2. The method of forming a punched article comprising forming a blank having a reduced portion and an enlarged substantially cylindrical portion with rounded corners, placing said reduced portion blank in a holding die having an axially extending cylindrical projection of the same diameter as the said cylindrical portion of said blank, surrounding said cylindrical portion of said blank and projection with a sleeve having an internal diameter equal to that of the die projection, and punching said blank while cold to substantially fill in the corners and to extrude metal against the wall of said sleeve, said extruding metal carrying said sleeve with it during the punching operation.

3. A method of making a headed, socketed article comprising extruding a blank to form a shank portion of reduced section and an unworked head part, upsetting said head part to form a substantially cylindrical head of greater section, surrounding said cylindrical head part with a freely movable sleeve, and socketing said head part while cold by advancing a punch therein so that the extruded metal around the punch carries said sleeve with it in a direction opposite the punch advance whereby sleeve wear is minimized.

4. A method of making a headed, socketed article comprising extruding a blank to form a shank portion of reduced section and an unworked head part, upsetting said head part to form a substantially cylindrical head of greater section with rounded corners, surrounding said cylindrical head part with a freely movable sleeve, and socketing said head part by advancing a punch therein while cold so that the metal fills in the corners and extruded metal moving in a direction opposite the motion of the punch and engaging the walls of the sleeve carries said sleeve with it whereby sleeve wear is minimized.

5. In a cold header, tool and die means for forming a blank having a shank portion and head part, other tool and die means, said tool including an independently movable sleeve and a punch, said second die having an axial projection the outer edge thereof being of complementary shape to the aperture in said sleeve, means to move said sleeve to surround the head part of said blank and the projection on said die, and means to move said punch to socket said head part while cold to extrude metal against the wall of said sleeve, said extruding metal carrying said sleeve with it during the socketing operation.

6. Apparatus for punching an article comprising a die block having an axial projection of the same peripheral shape as a portion of an article to be punched, a reciprocating header slide, a sleeve member slidably mounted in said slide, a punch mounted on said header slide, means to cause said sleeve to advance over and surround a portion of said article and the projection on said die whereby said article portion is confined, means to force said punch into said article after said sleeve has confined it, said sleeve being free to move in a direction opposite to punch motion under the pressure of extruded metal of said article.

JOHN H. FRIEDMAN.

REFERENCES CITED

The following references are of record in the file of this patent:

UNITED STATES PATENTS

| Number | Name | Date |
| --- | --- | --- |
| 1,856,027 | Clouse | Apr. 26, 1932 |
| 2,030,290 | Friedman | Feb. 11, 1936 |
| 2,093,646 | Purtell | Sept. 21, 1937 |
| 2,299,105 | Muir | Oct. 20, 1942 |
| 2,368,603 | Welsford | Jan. 30, 1945 |
| 2,417,569 | Rice | Mar. 18, 1947 |